May 22, 1956 J. GOLDEN 2,746,660
AUTOMOBILE CLOTHES SUPPORT
Filed Sept. 23, 1953
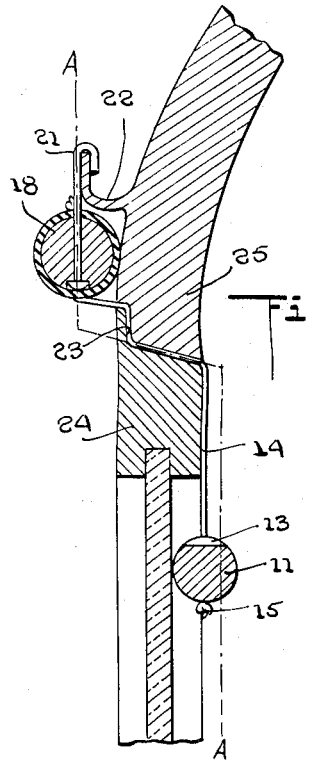
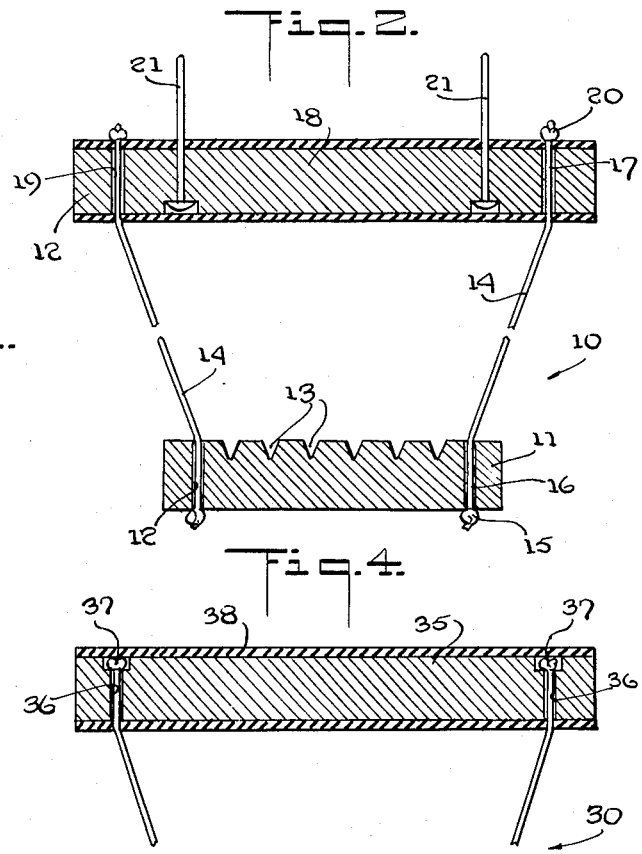
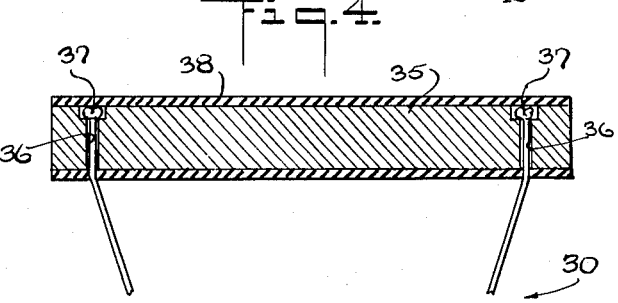
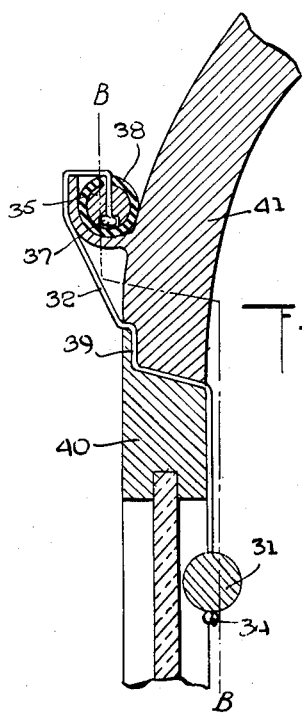
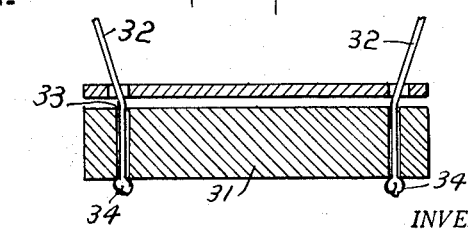
INVENTOR.
JONATHAN GOLDEN
BY J. Walton Bader
ATTORNEY

United States Patent Office 2,746,660
Patented May 22, 1956

2,746,660

AUTOMOBILE CLOTHES SUPPORT

Jonathan Golden, Atlanta, Ga.

Application September 23, 1953, Serial No. 381,949

3 Claims. (Cl. 224—42.1)

This invention relates to an automobile clothing support which is of novel construction.

Automobile clothing supports per se are not new. However heretofore no satisfactory type has been developed. The prior art supports have been bulky, expensive and unsatisfactory in operation.

The invention herein has for its principal objects the production of an automobile clothing support which is extremely inexpensive, is durable, and is entirely satisfactory in operation.

The invention operates by utilizing the outer surface of the automobile to secure a tying member. The tying member is passed between the space between a door member and its jamb member of the automobile and is then secured to a clothing hanger support member which is on the inside of the car. Since the support member is secured to the tying member, and the tying member is flexible, the motion of the car will not disarrange the clothing disposed upon the support member.

The invention will be further described by reference to the accompany drawings which are made a part of this specification.

Fig. 1 is a sectional view through a door and jamb of an automobile showing the principal form of this invention in operating position.

Fig. 2 is a sectional view of the principal form of this invention showing the internal construction. The plane upon which this view is taken is indicated by the broken line A—A in Fig. 1.

Fig. 3 is a sectional view similar to Fig. 1 but showing an alternative form of the invention.

Figs. 4 and 5 are sectional views of the form of the invention shown in Fig. 3. The plane upon which these views are taken is indicated by the broken line B—B in Fig. 3.

Referring to the principal form of the invention shown in Figs. 1 and 2 automobile clothing support 10 is formed with clothes hanger holding member 11. Clothes hanger holding member 11 is preferably formed with holes 12 and cut out portions 13 which are adapted to hold clothes hangers. Clothes hanger holding member 11 is preferably in bar form. Holding member 11 is designed to be disposed within the automobile alongside a door thereof.

Tying members 14 are flexible and are preferably secured to holding member 11 by means of knots 15. Tying members 14 are disposed at one end 16 thereof within holes 12.

The other ends 17 of tying members 14 are preferably secured to an additional holding member 18 which is also preferably in bar form. Holding member 18 is also preferably formed with holes 19 in which ends 17 of tying members 14 are disposed. Tying members 14 are held to holding member 18 by knots 20.

Hooks 21 are secured to holding member 18 and are adapted to fit into rain gutter 22 of the automobile thereby holding member 18 in place. It is pointed out that holding member 18 is spaced from clothes hanger holding member 11 by tying members 14 intervening. Tying members 14 are adapted to pass through the space 23 which is present between a door 24 and its jamb 25 of the automobile. Since tying members 14 are flexible they pass through this space and adapt themselves to its formation. The space, however, is small so that tying members 14 must be of small cross-section. Thus while holding member 18 is on the outside of the automobile and is firmly secured in place at that point, holding member 11 is on the inside of the automobile and may be used to hang clothese thereon.

Figs. 3–5 show an alternative form of the invention.

In this form automobile clothing support 30 is formed with clothes hanger holding member 31. Tying members 32 are secured within holes 33 by knots 34 as in the principal form of the invention. Tying members 32 are also secured to additional holding member 35 by means of holes 36 and knots 37. However this form of the invention is not provided with hooks upon the additional holding member but instead additional holding member 35 is adapted to fit into rain gutter 47 of the automobile. This fit is aided by the provision of a resilient envelope made of rubber or the like surrounding holding member 35. This envelope is designated by the reference numeral 38.

In the alternative form of this invention as well as in the principal form tying members 32 are adapted to fit into the space 39 between a door 40 of the automobile and its jamb 41.

The foregoing specific embodiments of this invention as set forth in the above specification and drawings are for illustrative purposes and for purposes of example only. Various changes and modifications can obviously be made within the spirit and scope of the invention and would occur to those skilled in this art.

I claim:

1. An automobile clothing support comprising a rigid bar shaped holding member adapted to support a clothing hanger device and designed to be disposed within the automobile alongside one of the doors thereof, a pair of tying members of flexible material and of small cross-section secured to said holding member at the end portions thereof and adapted to be secured within the space found between the top of the door and the jamb thereof, an additional bar shaped rigid holding member, said tying members being also secured to the end portions of said additional holding member, said additional holding member being designed to be disposed upon the outside of the automobile in adjacent relationship with the door and alongside one of the rain gutters thereof, and a pair of rigid hook members secured to said additional holding member at the ends thereof and adapted to secure said additional holding member to the rain gutter.

2. An automobile clothing support as described in claim 1 wherein said additional holding member is surrounded by a resilient envelope.

3. An automobile clothing support as described in claim 1 wherein said first mentioned holding member is provided with a plurality of spaced cut-out portions.

References Cited in the file of this patent

UNITED STATES PATENTS

| | | |
|---|---|---|
| 1,022,449 | Ward | Apr. 9, 1912 |
| 1,584,910 | Volker | May 18, 1926 |
| 1,858,653 | Willcox | May 17, 1932 |
| 2,434,387 | Brandt | Jan. 13, 1948 |
| 2,480,327 | Idelsohn | Aug. 30, 1949 |
| 2,483,781 | Perryman | Oct. 4, 1949 |
| 2,516,617 | Coughlin | July 25, 1950 |
| 2,542,369 | Steendahl | Feb. 20, 1951 |
| 2,549,391 | Secord | Apr. 17, 1951 |

FOREIGN PATENTS

| | | |
|---|---|---|
| 10,144 | Great Britain | Oct. 23, 1913 |